United States Patent
Reddy et al.

(10) Patent No.: US 7,442,349 B2
(45) Date of Patent: Oct. 28, 2008

(54) AMMONIA PLANT CONFIGURATION AND METHODS

(75) Inventors: Satish Reddy, Irvine, CA (US); Mukund Bhakta, Cerritos, CA (US); Sunil Vyas, Laguna Niguel, CA (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 563 days.

(21) Appl. No.: 10/480,404

(22) PCT Filed: Jun. 27, 2002

(86) PCT No.: PCT/US02/20508

§ 371 (c)(1),
(2), (4) Date: Jun. 14, 2004

(87) PCT Pub. No.: WO03/002459

PCT Pub. Date: Jan. 9, 2003

(65) Prior Publication Data

US 2004/0234426 A1 Nov. 25, 2004

Related U.S. Application Data

(60) Provisional application No. 60/302,055, filed on Jun. 28, 2001.

(51) Int. Cl.
*B01J 19/00* (2006.01)

(52) U.S. Cl. .................... 422/198; 422/200; 48/127.1; 48/127.3; 48/127.7

(58) Field of Classification Search ............... 48/127.1, 48/127.3, 127.7; 422/190, 198, 200; 423/359
See application file for complete search history.

(56) References Cited

U.S. PATENT DOCUMENTS

| | | | | | |
|---|---|---|---|---|---|
| 3,442,613 | A | * | 5/1969 | Grotz, Jr. .................. | 423/354 |
| 4,624,841 | A | * | 11/1986 | Hidaki ..................... | 423/359 |
| 4,699,772 | A | * | 10/1987 | de Lathouder ............ | 423/359 |
| 4,910,007 | A | * | 3/1990 | Pinto et al. ................ | 423/359 |
| 5,935,544 | A | * | 8/1999 | Bhakta ..................... | 423/359 |
| 6,086,840 | A | * | 7/2000 | Whitney et al. ........... | 423/359 |
| 6,455,011 | B1 | * | 9/2002 | Fujimura et al. .......... | 422/139 |
| 6,551,380 | B1 | * | 4/2003 | Reddy et al. ................ | 95/41 |
| 6,620,399 | B1 | * | 9/2003 | Jungerhans ............... | 423/359 |
| 6,811,762 | B2 | * | 11/2004 | Moore ..................... | 423/359 |

\* cited by examiner

*Primary Examiner*—N. Bhat
(74) *Attorney, Agent, or Firm*—Fish & Associates, PC (57) ABSTRACT

A synthesis plant includes a separation system upstream of a synthesis loop that removes excess nitrogen and other gaseous compounds from a feed gas having a ratio of hydrogen to nitrogen of less than 3:1, thereby producing a syngas with a ratio of hydrogen to nitrogen at about 3:1. Particularly preferred separation systems include a coldbox with a refrigerant other than air, or a pressure swing absorption system.

16 Claims, 6 Drawing Sheets

AMMONIA PLANT CONFIGURATION AND METHODS

This application claims priority to U.S. provisional patent application with the Ser. No. 60/302,055, which was filed on Jun. 28, 2001 and is incorporated by reference herein.

BACKGROUND OF THE INVENTION

The relatively high price of natural gas has recently resulted in the closure of a few inefficient ammonia plants in the US. To make matters worse, natural gas prices are expected to remain high in the foreseeable future. Thus, for ammonia plants to become and remain profitable, it will be imperative to increase revenue and reduce operating costs. Viewed from another perspective, plants will have to find ways to increase production and reduce their energy consumption per ton of ammonia produced.

Figure 1:
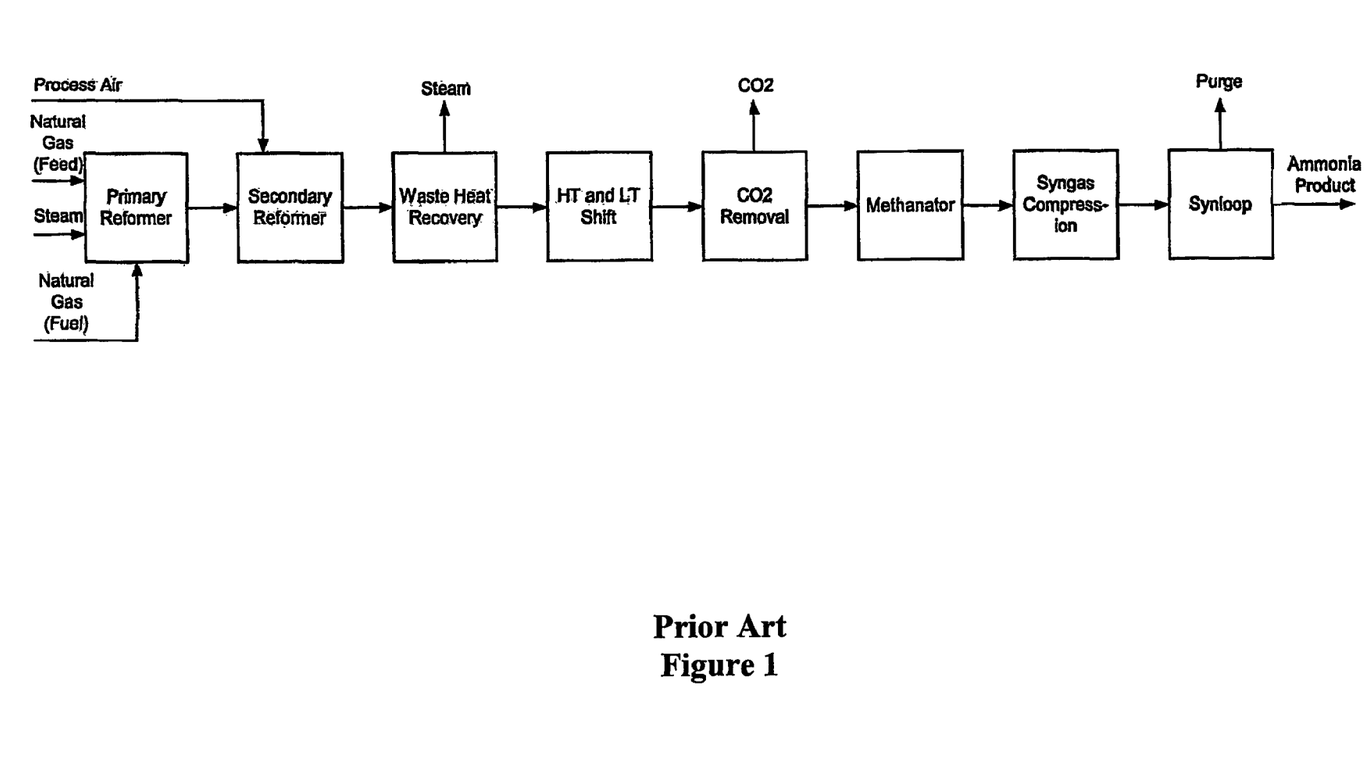
FIG. 1 is a prior art schematic of a known configuration for an ammonia plant.

In a typical prior art plant configuration as depicted in Prior art FIG. 1, natural gas is processed through primary and secondary reformers, and the reformed gas stream is then subjected to a shift conversion after excess heat has been recovered from the reformed gas stream. In a further step, acid gas (here: carbon dioxide) is removed, and residual carbon monoxide (CO) and carbon dioxide ($CO_2$) are almost completely eliminated in a methanator. The resulting gas stream is then passed into the synthesis loop for production of ammonia, wherein the nitrogen is typically provided from process air that is fed into the secondary reformer.

Production capacity can be increased by removing excess nitrogen from the syngas stream by combination of gas expansion, autorefrigeration, and cryogenic separation as for example described in U.S. Pat. No. 3,442,613 to Grotz. While Grotz's configuration is relatively effective in some ammonia production plants, retrofitting of existing plants is relatively problematic since the expansion step requires considerable increase in front-end pressure in a ammonia synthesis plant (and thereby typically necessitating retrofits/rebuilds to accommodate for the increased pressure).

To circumvent at least some of the problems associated with retrofitting existing ammonia synthesis production plants, Bhakta describes in U.S. Pat. No. 5,935,544 a configuration in which a purifier process has been applied to a low methane content syngas with moderate $N_2$ excess, wherein an external refrigeration step produces a syngas with sufficiently low inert content to significantly increase synthesis capacity or decrease in synthesis loop pressure. Although Bhakta's configuration overcomes in many cases the need for retrofitting existing plants, Bhakta's configuration is typically limited to relatively narrow process parameters in order to provide satisfactory improvements in synthesis capacity.

Although there are various configurations and processes for improvements of ammonia synthesis are known in the art, all or almost all of them suffer from one or more disadvantages. Therefore, there is still a need to provide improved methods and configurations for improved of ammonia synthesis.

SUMMARY OF THE INVENTION

The present invention is generally directed towards configurations and methods of a plant, and especially a synthesis plant, in which excess nitrogen and other gases components are removed from a gas stream using a separator upstream from a synthesis loop.

In one particularly preferred aspect of the inventive subject matter, contemplated plants include an ammonia synthesis loop that receives an ammonia synthesis make-up gas having a molar ratio of hydrogen to nitrogen of about 3.0 that is cooled in a refrigeration circuit using a refrigerant other than air (and optionally fuel gas), and wherein a separation unit separates a feed gas having a molar ratio of hydrogen to nitrogen of less than 2.5 into a fuel gas and the ammonia synthesis make-up gas.

Preferred refrigerants include the fuel gas (which may be combusted in a reformer after the fuel gas cooling the ammonia synthesis make-up gas) and refrigerants that are substantially devoid of a component that forms an explosive or reactive mixture with the ammonia synthesis make-up gas (e.g., a gas comprising at least 98 vol % nitrogen). It is also contemplated that suitable refrigerants may be at least partially, and more preferably entirely recycled within the plant. The term "refrigerant other than air" refers to any gaseous (at 20° C.) refrigerant that has a composition other than the average composition of air (i.e., $N_2$ about 78%, $O_2$ about 21%, Argon about 0.9%, $CO_2$ about 0.03%, wherein the term about refers to absolute deviations of no more than 10%). Consequently, contemplated refrigerants especially include processed air from which at least one component (e.g., oxygen) has been at least partially removed, or to which at least one component (e.g., nitrogen) has been added, and partially (to at least 70% purity) or highly (to at least 95% purity) purified gases.

It is further contemplated that the refrigeration circuit may functionally cooperate with a plant configuration as an upgrade that increases an ammonia production of the plant configuration in an amount of between about 0.1% to 25%, and in yet further aspects of the inventive subject matter, the ammonia synthesis make-up gas is produced from natural gas via a primary and secondary reformers, wherein an air separation unit provides an oxygen rich stream to the secondary reformer, and wherein the air separation unit further provides a nitrogen rich stream to the ammonia synthesis make-up gas at a position upstream of the separation unit.

In another particularly preferred aspect of the inventive subject matter, contemplated plants may include a pressure swing absorption unit that receives a first portion of a feed gas having a molar ratio of hydrogen to nitrogen of less than 2.9 and produces a hydrogen product gas a fuel gas, and may still further include a synthesis loop that receives an ammonia synthesis make-up gas that is formed from at least the hydrogen product gas and a second portion of the feed gas.

Especially preferred feed gas is produced in such configurations from a natural gas via a primary and secondary reformer, and wherein additional process air is provided to the secondary reformer, and suitable plants may advantageously further include a methanator and/or an acid gas removal unit upstream of the pressure swing absorption unit. In yet further contemplated aspects, the synthesis loop produces a purge gas, and at least one of the purge gas and the fuel gas are combusted in the primary reformer. The ammonia synthesis make-up gas preferably has a molar ratio of hydrogen to nitrogen of about 3:1, and at least a portion of nitrogen, argon, and methane contained in the feed gas is removed from the feed gas in the pressure swing absorption unit via the fuel gas. While contemplated configurations may be operated as new plants, it is especially contemplated that the pressure swing absorption unit may functionally cooperate with a plant configuration as an upgrade that increases an ammonia production of the plant configuration in an amount of between about 0.1% to 25%.

Various objects, features, aspects and advantages of the present invention will become more apparent from the following detailed description of preferred embodiments of the invention, along with the accompanying drawings in which like numerals represent like components.

DETAILED DESCRIPTION

The majority of ammonia plants operating today use a stoichiometric amount of process air in the secondary reformer in order to maintain a hydrogen to nitrogen molar ratio of 3 to 1 in the methanator effluent gas, which is typically the make-up gas to the ammonia synthesis loop.

The inventors have discovered that a separation system, and most preferably a coldbox or pressure swing absorption (PSA) system can advantageously be integrated in an ammonia production plant (e.g., installed downstream of a methanator to process the methanator effluent gas before it enters the ammonia synthesis loop), thereby increasing the production capacity and/or reducing the energy requirements. Thus, excess air and/or nitrogen can be introduced to the front-end of the syngas production process to improve capacity in contemplated configurations, while maintaining the stoichiometric ratio of hydrogen to nitrogen at about 3:1. The term "a molar ratio of hydrogen to nitrogen of about 3.0" as used herein refers to molar ratios of between 2.95 to 3.05, and more preferably between 2.97 to 3.03, and most preferably between 2.99 to 3.01. Moreover, it should be appreciated that contemplated configurations may be operated using relatively wide process parameters while improving productivity and/or reducing energy requirements.

Figure 2:
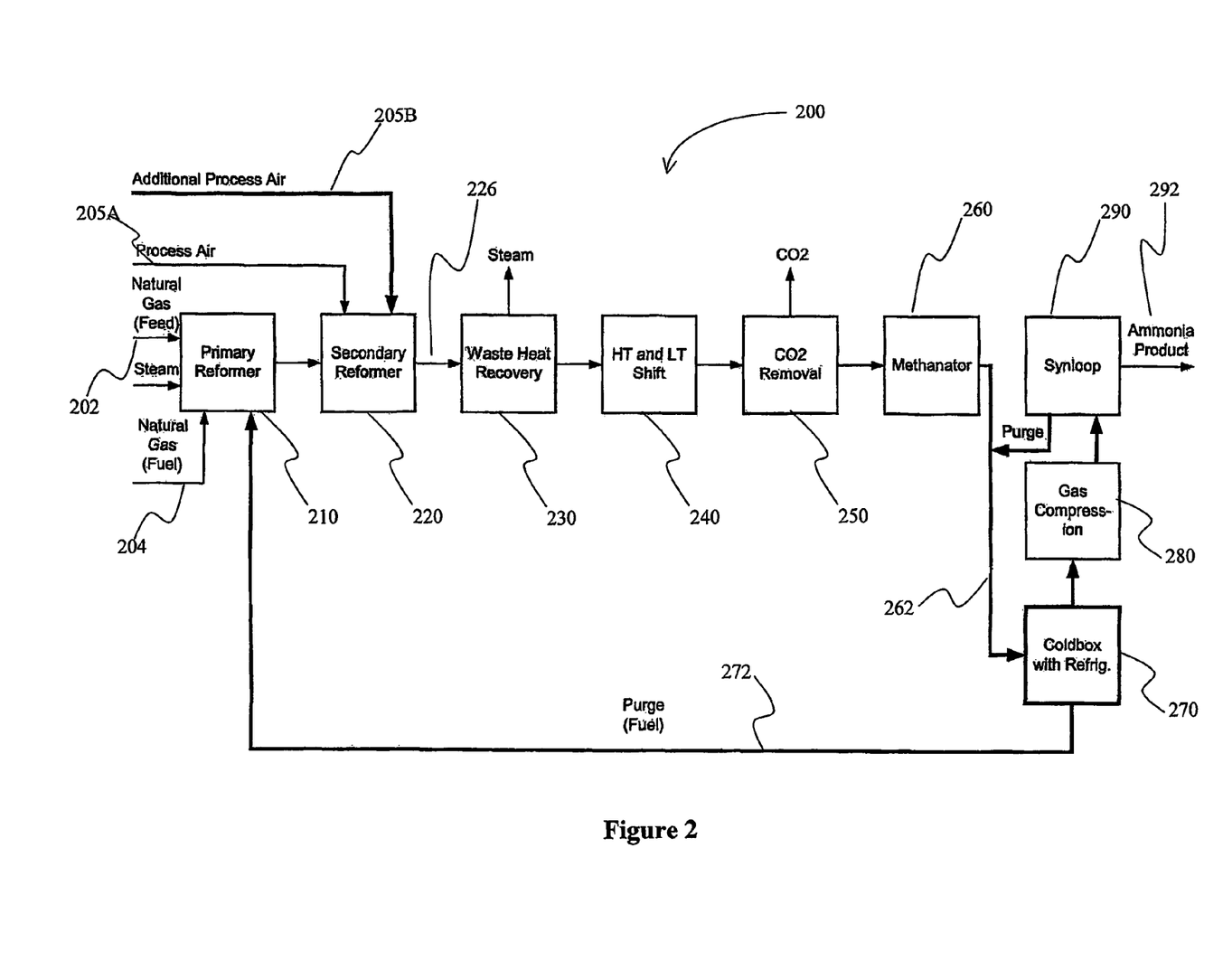
FIG. 2 is an exemplary configuration of one contemplated ammonia plant that includes a coldbox.

One exemplary configuration of contemplated ammonia synthesis plants including a coldbox is depicted in FIG. 2. In particular, it is contemplated that installation of a coldbox allows addition of significant quantities of excess air, typically at least 5%, more typically at least 15%, and most typically between at least 20 to 25 percent and even more excess process air (i.e. more than the stoichiometric amount) in the secondary reformer. Consequently, significantly more methane and other hydrocarbons can be reformed in the secondary reformer, thereby increasing the plant's net syngas production without raising the primary reformer heat load.

In the exemplary configuration of FIG. 2, plant 200 includes primary and secondary reformers 210 and 220, respectively, in which the natural gas feed 202 is converted using steam 204, stoichiometric amounts of process air 205A, additional process air 205B, and appropriate catalysts/reaction conditions to produce reformer effluent 226 predominantly comprising carbon monoxide, hydrogen, and nitrogen. The term "stoichiometric amounts of process air" refers to the quantity of process air that will provide a molar ratio of hydrogen to nitrogen of about 3.0 after shift conversion and optionally after the methanator in the syngas.

Heat from the reforming process is recovered in a waste heat recovery unit 230, and the reformer effluent is shift converted in one or more downstream shift converters (e.g., high and low temperature shift converters) 240 to produce converter effluent 242, predominantly comprising hydrogen, nitrogen, and carbon dioxide. A subsequent acid gas removal unit (here: carbon dioxide removal unit) 250 removes significant quantities of carbon dioxide, and a methanator 260 downstream of the acid gas removal unit converts residual carbon monoxide and carbon dioxide to methane.

Methanator effluent 262 is fed to coldbox 270 that is operated under conditions to separate the methanator effluent 262 into a fuel gas portion 272 predominantly comprising methane, hydrogen, and nitrogen, and a purified and cooled syngas with a nitrogen to hydrogen ratio of about 3:1. The fuel gas is preferably fed into the burner of the primary reformer 210, while the cooled synthesis gas is compressed in syngas compressor 280 before entering the synthesis loop 290. Synthesis loop 290 produces ammonia product 292 and purge gas 294, which is optionally combined with fuel gas 272 for combustion in the primary reformer 210.

Figure 3:
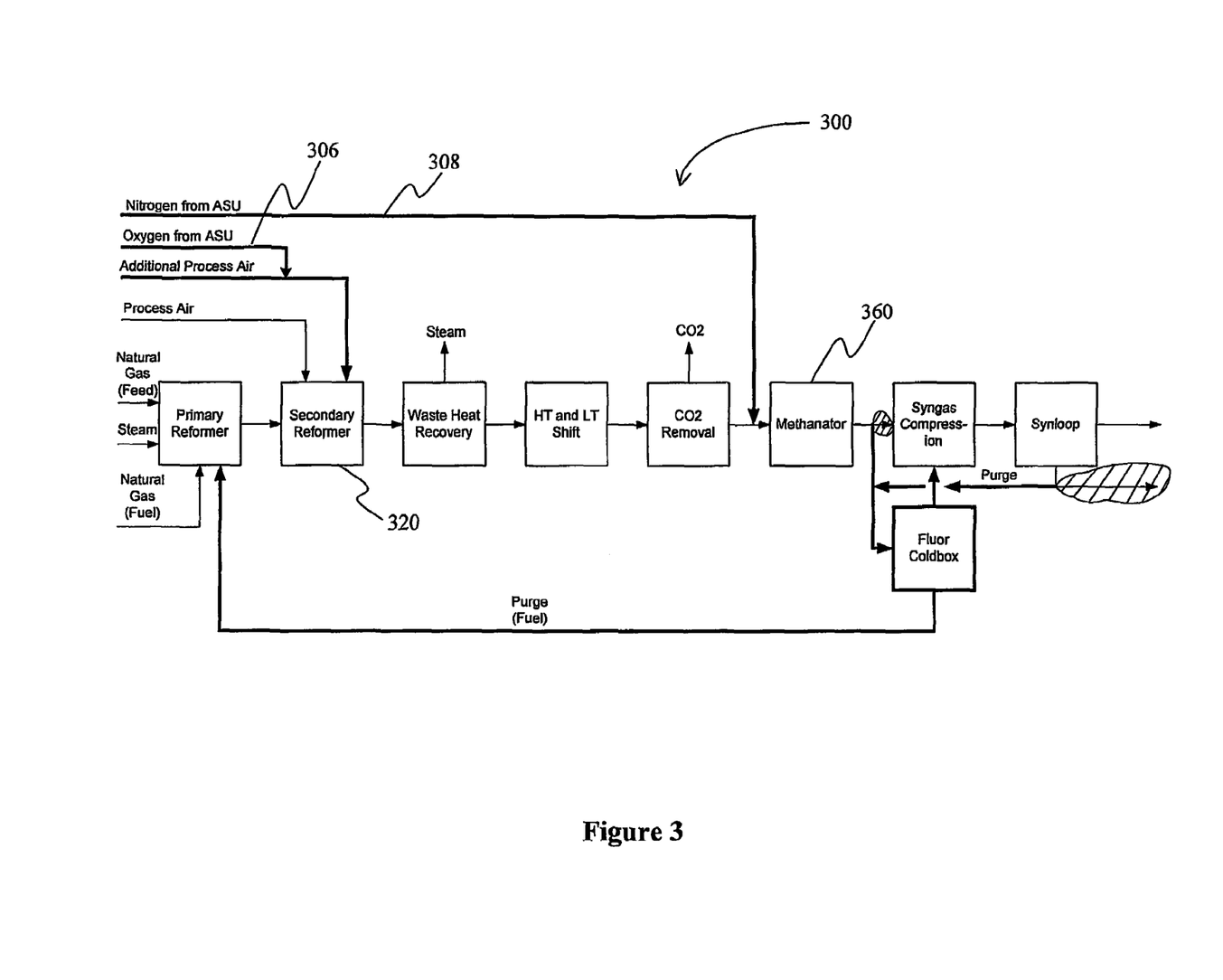
FIG. 3 is an exemplary configuration of another contemplated ammonia plant that includes a coldbox.

Alternatively, or additionally as depicted in FIG. 3, ammonia production may be further improved in a plant 300 where an air separation unit is available. In such configurations, an oxygen-rich gas 306 (i.e., comprising at least 25 mol %, more typically at least 75 mol %, and most typically at least 90 mol % oxygen) may be provided to the secondary reformer 320, and a nitrogen rich gas 308 (i.e., comprising at least 25 mol %, more typically at least 75 mol %, and most typically at least 90 mol % oxygen) may be introduced to the reformed and/or shift converted gas at a position upstream of the methanator 360.

It should be especially appreciated that configurations as depicted in FIGS. 2 and 3 will generally have little or no effect on the operational requirements of the primary reformer. Moreover, excess nitrogen (i.e., nitrogen above quantities required to obtain a molar ratio of hydrogen to nitrogen of about 3:1) from the air separation unit (in configurations according to FIG. 3) is added upstream of the methanator, which is thought to act as a wash to the syngas and to remove argon and methane in the coldbox while maintaining a molar ratio between hydrogen to nitrogen of about 3:1. Among other things, it should be particularly appreciated that such configurations, and especially when used as an upgrade to an existing ammonia plant, increase in ammonia production may be achieved without hydraulically limiting the plant at the front end.

Still further, it should be especially noted that due to the use of excess air in the secondary reformer (see e.g., FIG. 2), or due to the introduction of a nitrogen rich gas at a position upstream of the methanator (see e.g., FIG. 3), the nitrogen content in the methanator effluent gas will be more than that required to maintain a 3:1 molar ratio of hydrogen to nitrogen in the feed to the ammonia synthesis loop. Consequently, a coldbox system is contemplated that removes, among other components, excess nitrogen. For example, it is contemplated that suitable coldbox systems may also remove most of the methane and about 30 percent of the incoming argon.

Therefore, it is contemplated that the make-up gas delivered to the ammonia synthesis loop will contain significantly less inerts than before and thus assist in reduction of the ammonia synthesis loop circulation rates and operating pressure (and consequently save energy). Although it has been previously known to employ a cold box with a configuration as described by Grotz et al in existing plants (see e.g., U.S. Pat. No. 3,442,613), upgrading of existing plants with a cold box is frequently problematic. Among other difficulties, configurations as described by Grotz et al typically operate at relatively high pressure drops (up to 30 psi-70 psi in the expander plus 15 psi in the cold box), thereby typically necessitating further modifications in the plant configuration (and thereby incurring additional cost) during upgrading.

Figure 4:
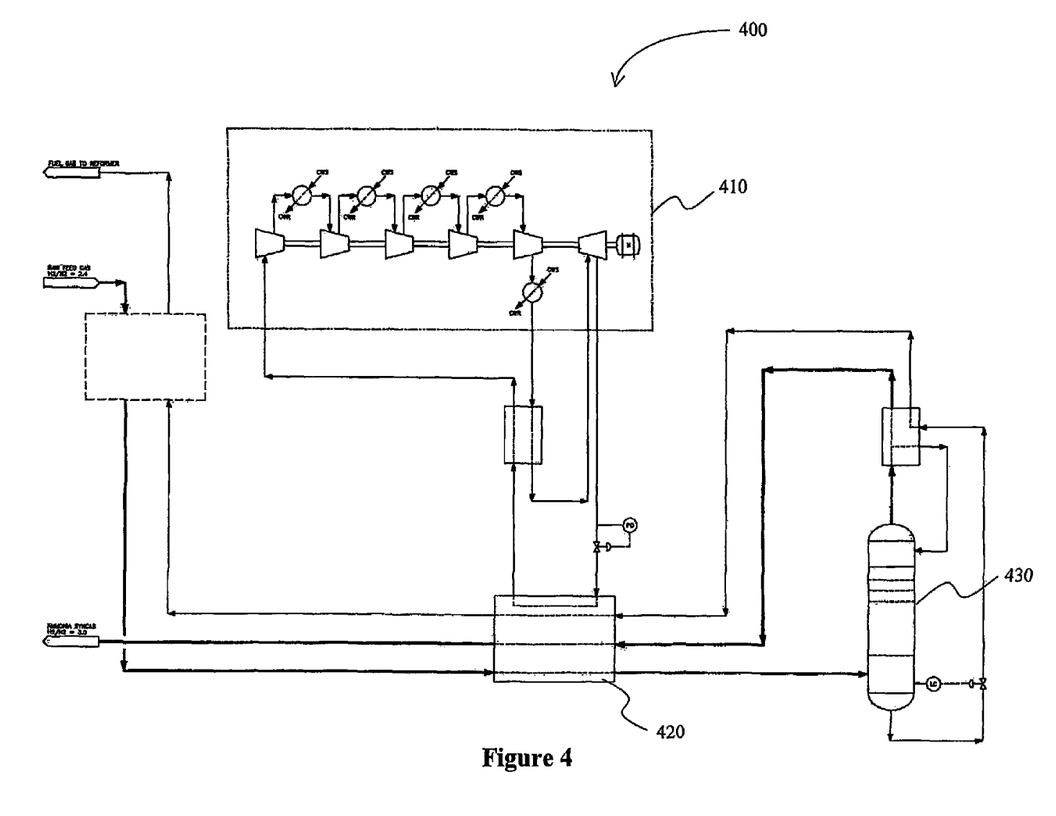
FIG. 4 is an exemplary detail of a coldbox using nitrogen as a refrigerant in an ammonia plant.

A particularly preferred exemplary coldbox system 400 is depicted in FIG. 4 and typically includes an refrigeration circuit 410 (preferably an external nitrogen circuit) having a compressor and an expander, a low temperature exchanger 420, and a separation column 430 to remove excess nitrogen and produce an ammonia synthesis make-up gas which contains significantly less inerts (e.g., nitrogen, argon, etc.) than before. Particularly contemplated refrigerants in such systems are substantially devoid (i.e., have less than 5 vol %, more typically less than 1 vol %, and most typically less than 0.1 vol %) of components that could form explosive or otherwise reactive mixtures (e.g., oxidizing mixtures) with syngas should a leakage in the system occur. Therefore, an especially preferred refrigerant comprises at least 98 vol % nitrogen, which is partially, and more preferably entirely recycled in the refrigeration circuit. However, in alternative aspects, contemplated refrigerants may also comprise nitrogen in an amount between about 0% to 40%, more preferably between 40% and 70%, and most preferably between 70% and 100%. It should further be appreciated that the raw feed gas in contemplated configurations is at least partially dried using a desiccant.

Figure 5:
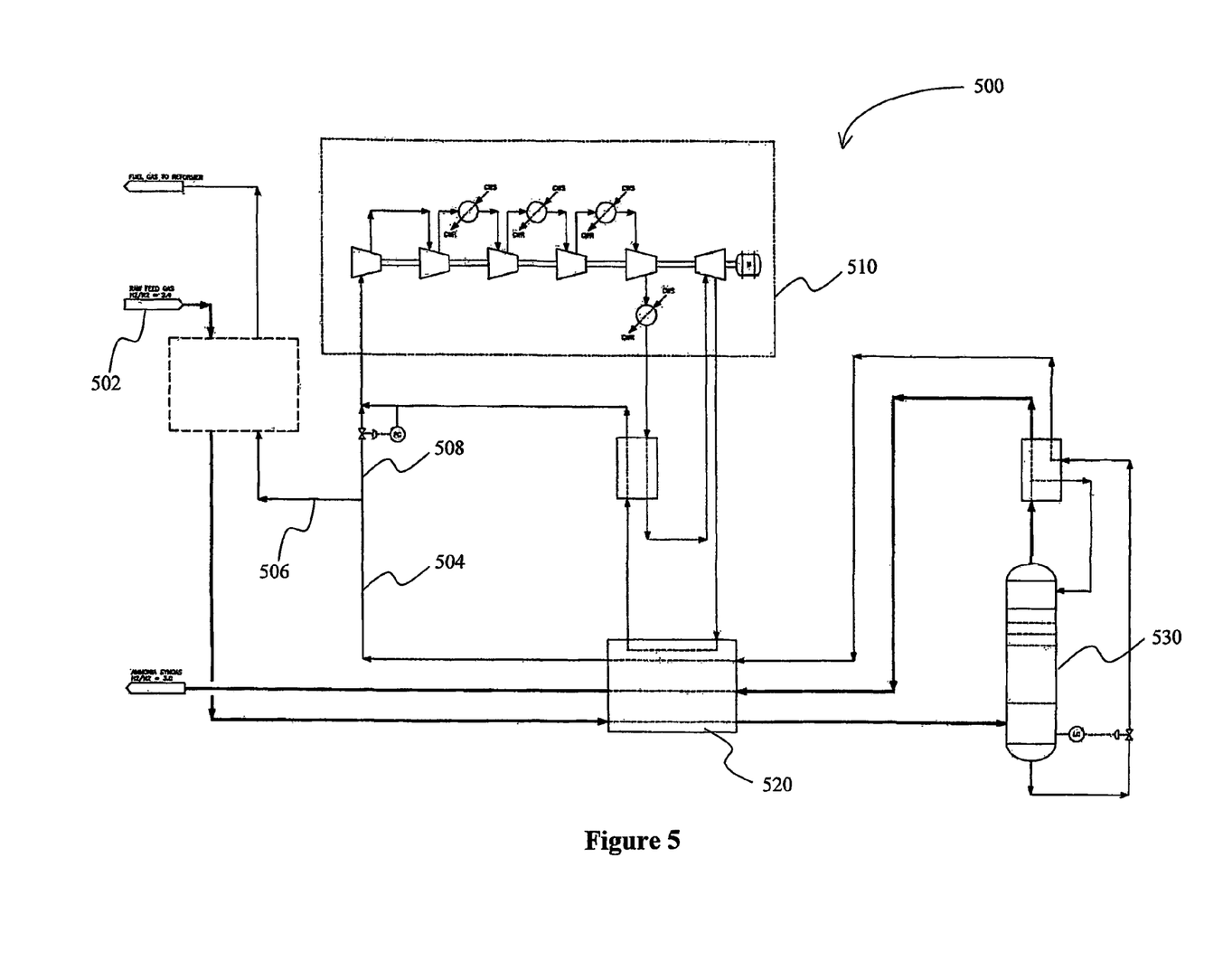
FIG. 5 is an exemplary detail of a coldbox using tail gas as a refrigerant in an ammonia plant.

Alternatively, ammonia syngas is cooled by a tailgas of a separator column as depicted in FIG. 5. Here, dry raw feed is provided to the separator column and separated into ammonia syngas and tail gas. At least a portion of the tail gas is then passed through the low temperature exchanger and compressed in a compressor. The compressed tailgas is cooled by expansion in an expander, and the cooled and expanded tailgas is passed back to the low temperature exchanger to cool the raw feed gas. Alternatively, nitrogen may be employed as refrigerant and the tailgas is passed to the fuel gas header.

Thus, it is contemplated that one portion of the waste gas may be recycled within an external refrigeration loop, while another portion of the waste gas is employed as fuel gas. It should especially be recognized that in such configurations the composition of the refrigerant can advantageously be maintained at a substantially constant composition even when the composition of the waste gas varies, and in still further preferred configurations, a control valve controls the amount of waste gas that is fed into the refrigeration loop to compensate for minor compressor seal leakages or other leakages in the refrigeration loop.

An exemplary configuration of such excess nitrogen removal and/or syngas purification is shown in FIG. 5. Here, the plant includes a coldbox system 500, in which the methanator effluent gas stream 502 (or other gas stream depending on the particular application) is cooled using refrigeration circuit 510 and cold exchanger 520, and separated in a separator 530. In such configurations, it is contemplated that the separator separates ammonia syngas from the feed gas, and further provides a waste gas stream 504 containing at least part of the excess nitrogen.

In a particularly preferred aspect of the inventive subject matter, the waste gas 504 is split into a first and a second gas stream 506 and 508, respectively, wherein the first gas stream 506 is used as a fuel gas (e.g., in a reformer), and wherein the second gas stream 508 is employed as a refrigerant via compression, cooling, and expansion in an expander. In especially preferred cold box systems, the refrigeration circuit comprises a compressor and an expander, and at least one of the compressor and the expander is mechanically coupled to a process air compressor. Thus, it should be recognized that at least a portion of the waste gas stream is employed as a refrigerant to cool the methanator effluent gas stream or other gas stream.

In a computer calculation, the impact of installing a contemplated coldbox system in a typical ammonia plant was studied using Pro II™ Software. From this simulation and other calculations (not shown), the inventors contemplate that by employing a cold box system (1) ammonia production in conventional plants can be increased by about 18%, (2) wherein the increase in ammonia production may be achieved by maintaining the same primary reformer fired duty, (3) where higher production rates are achieved, the primary reformer outlet temperature can be lowered about 80° F., thereby achieving a longer primary reformer tube life and radiant heat load, and (4) carbon dioxide production increases by about 23 percent. It is still further contemplated that depending on the particular configuration of contemplated plants, ammonia production in conventional plants can be increased by at least 18%, and more preferably at least 20%, and that consumption of fuel per unit of produced ammonia in an upgrade configuration could be reduced in an amount of between about 0.1% to 25%.

Consequently, particularly preferred plants will include an ammonia synthesis loop that receives an ammonia synthesis make-up gas having a molar ratio of hydrogen to nitrogen of about 3.0 and that is cooled in a refrigeration circuit using a refrigerant other than air and a fuel gas, wherein a separation unit separates a feed gas having a molar ratio of hydrogen to nitrogen of less than 2.5 into a fuel gas and the ammonia synthesis make-up gas. In further particularly preferred configurations, the refrigerant comprises at least some of the fuel gas (tail gas from the separator) or nitrogen or other inert gas, wherein some or all of the refrigerant may be recycled within the refrigeration circuit.

Figure 6:
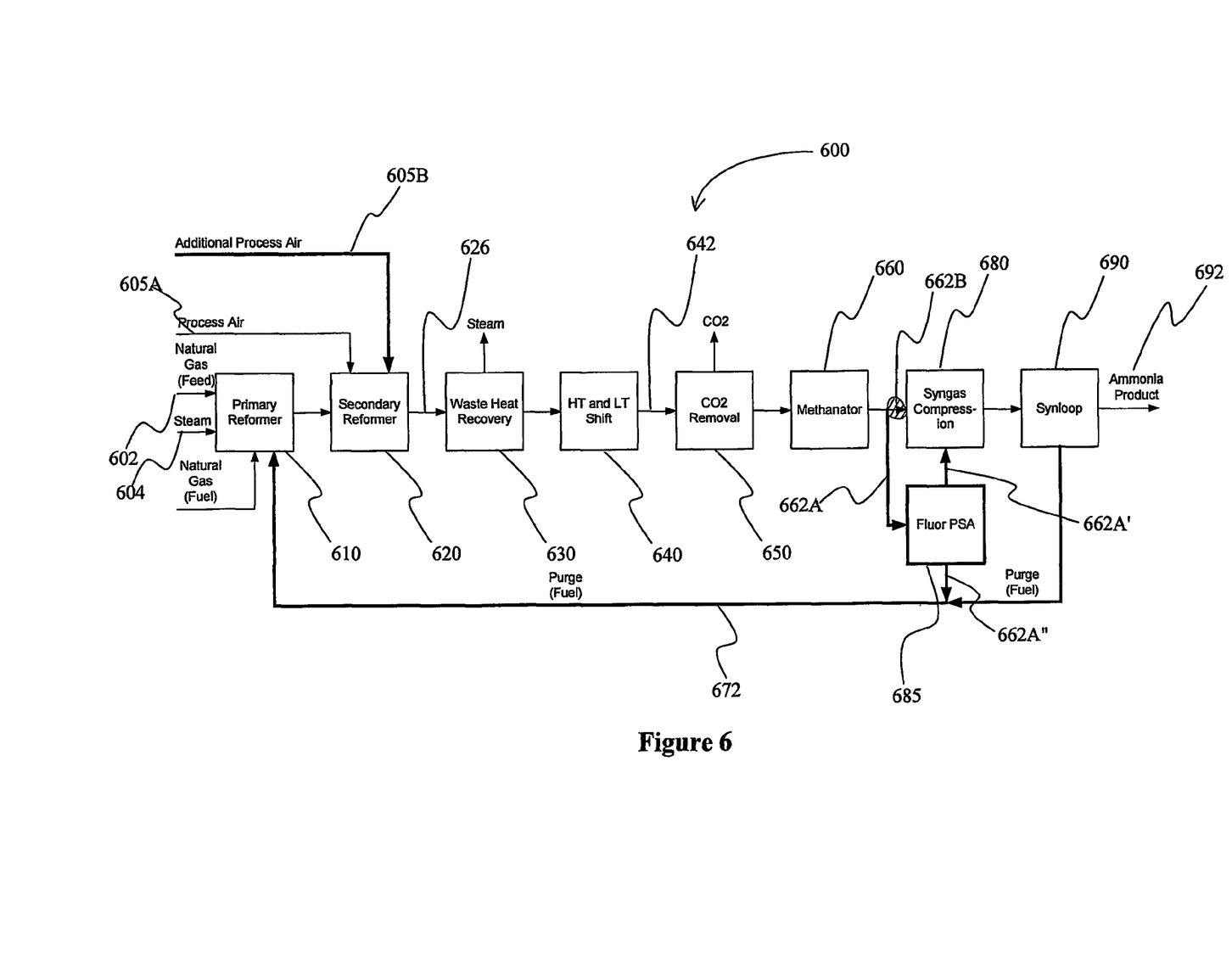
FIG. 6 is an exemplary configuration of yet another contemplated ammonia plant that includes a pressure swing absorption unit.

Another exemplary configuration of contemplated ammonia synthesis plants including a pressure swing absorption unit (PSA) is depicted in FIG. 6. Again, installation of a separation system to remove excess nitrogen (and other inert gases) is contemplated to allow operation of the syngas production under conditions that employ addition of significant quantities, and typically up to 20 to 25 percent excess process air (i.e. more than the stoichiometric amount) in the secondary reformer, thereby significantly boosting synthesis gas production. Consequently, more methane can be reformed in the secondary reformer, thereby increasing the plant's net syngas production without raising the primary reformer heat load.

In a particularly preferred configuration of a plant with a PSA (as shown in FIG. 6), plant 600 includes primary and secondary reformers 610 and 620, respectively, in which the natural gas feed 602 is converted using steam 604, stoichiometric amounts of process air 605A, additional process air 605B, and appropriate catalysts/reaction conditions to produce reformer effluent 626 predominantly comprising carbon monoxide, hydrogen, and nitrogen.

Heat from the reforming process is recovered in a waste heat recovery unit 630, and the reformer effluent is shift converted in one or more downstream shift converters (e.g., high and low temperature shift converters) 640 to produce converter effluent 642, predominantly comprising hydrogen, nitrogen, and carbon dioxide. A subsequent acid gas removal unit (here: carbon dioxide removal unit) 650 removes significant quantities of carbon dioxide, and a methanator 660 downstream of the acid gas removal unit converts residual carbon monoxide and carbon dioxide to methane.

A first portion of methanator effluent 662A is fed to the PSA 685 that separates the methanator effluent 662A into a hydrogen rich stream 662A' and a waste stream 662A", predominantly comprising methane, hydrogen, and nitrogen. A second portion of methanator effluent 662B is fed directly to the syngas compressor 680, that also compresses hydrogen rich stream 662A' to form a compressed syngas having a molar ratio of hydrogen to nitrogen of about 3.0. The waste gas is preferably combined with the purge gas from the synloop 690 to combined waste gas stream 672 and fed into the burner of primary reformer 610, while the synthesis loop 690 produces ammonia product 692.

Thus, preferred configurations particularly include those comprising a pressure swing absorption unit that receives a first portion of a feed gas having a molar ratio of hydrogen to nitrogen of less than 3.0 and produces a hydrogen product gas a fuel gas, and, a synthesis loop that receives an ammonia synthesis make-up gas that is formed from at least the hydrogen product gas and a second portion of the feed gas. It should be particularly appreciated that the use of a PSA unit to remove excess nitrogen from the syngas production stream may have various advantages over known systems (e.g., system described in U.S. Pat. No. 5,935,544 to Bhakta). Among other things, by modification of the volume ratio between the first and second portions of the methanator effluent (i.e., the portion that is directly fed to the synloop, and the portion that is fed to the PSA), the nitrogen content of the methanator effluent may vary considerably during operation. Furthermore, use of a PSA unit will typically avoid all or almost all of the difficulties associated with refrigeration (e.g., energy consumption by compressors and potential generation of explosive or otherwise reactive mixtures).

Consequently, it is contemplated that in preferred configurations, the ratio between the first and second portions of the methanator effluent can be varied between 99:1 (and even higher) and 1:99 (and lower where appropriate). However, the ratio between the first and second portions of the methanator effluent during typical operation will generally be in the range of about 1:3 and about 3:1. With respect to the PSA, it should be recognized that all PSA units are suitable for use herein that will produce a hydrogen product gas, and there are numerous such PSA units known in the art.

Furthermore, it should be appreciated that the PSA offgas need not necessarily be combined with the purge gas from the synloop to form a combined waste gas. For example, where a particular inert component in the PSA offgas is desired, it is contemplated that such a component may be isolated from the offgas using any suitable methods and/or configurations.

Still further, it should be recognized that in all of the contemplated configurations various modifications may be made without departing from the inventive concept presented herein. For example, while presence of a methanator is generally preferred (e.g., will significantly increase the fuel value), methanation is not a necessary prerequisite for contemplated configurations. Furthermore, carbon dioxide removal from the gas stream may be achieved using various methods known in the art, and all of the known methods and configurations are contemplated suitable for use herein. Consequently, suitable carbon dioxide removal may include use of physical or chemical solvents, or membranes. Moreover, contemplated acid gas removal also includes removal of compounds other than carbon dioxide, and contemplated compounds especially include hydrogen sulfide and other sulfur containing compounds.

Thus, specific embodiments and applications of improved ammonia plant configurations and methods have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A plant comprising:
   a primary reformer fluidly coupled to a secondary reformer, wherein the secondary reformer is configured to receive (a) a reformed gas from the primary reformer and (b) a stream of additional process air to thereby produce a reformer effluent that has a molar ratio of hydrogen to nitrogen of less than 2.5;
   an ammonia synthesis loop that is configured to form an ammonia product from an ammonia synthesis make-up gas having a molar ratio of hydrogen to nitrogen of about 3.0,
   wherein the synthesis loop is downstream of and operationally coupled to a refrigeration circuit that is configured to use a refrigerant other than air to cool the reformer effluent that has the molar ratio of hydrogen to nitrogen of less than 2.5; and
   a separation unit that is operationally coupled to the refrigeration circuit and that is upstream of and fluidly coupled to the synthesis loop, wherein the separation unit is configured to receive the cooled reformer effluent and to separate the cooled reformer effluent into a fuel gas and the ammonia synthesis make-up gas.

2. The plant of claim 1 wherein the refrigeration circuit is configured to use the fuel gas as refrigerant.

3. The plant of claim 2 wherein the primary reformer is configured to use the fuel gas for combustion after the fuel gas has cooled the ammonia synthesis make-up gas.

4. The plant of claim 1 wherein the refrigerant has a composition that is substantially devoid of a component that forms an explosive or reactive mixture with the ammonia synthesis make-up gas.

5. The plant of claim 4 wherein the refrigerant comprises at least 98 vol % nitrogen.

6. The plant of claim 4 wherein the refrigeration circuit comprises a recycle circuit that is configured to allow recycling of at least a portion of the refrigerant.

7. The plant of claim 1 wherein the refrigeration circuit is configured to functionally cooperate with a plant configuration as an upgrade that increases an ammonia production of the plant configuration in an amount of between about 0.1% to 25%.

8. The plant of claim 1 further comprising a primary and a secondary reformer, and an air separation unit that is configured to provide an oxygen rich stream to the secondary reformer, and wherein the air separation unit is further configured to provide a nitrogen rich stream to the ammonia synthesis make-up gas at a position upstream of the separation unit, and wherein the primary reformer is further configured to receive natural gas as feed.

9. A plant comprising:
   a primary reformer fluidly coupled to a secondary reformer, wherein the secondary reformer is configured to receive (a) a reformed gas from the primary reformer and (b) a stream of additional process air to thereby produce a reformer effluent that has a molar ratio of hydrogen to nitrogen of less than 3.0;

a pressure swing absorption unit that is configured to receive a first portion of the reformer effluent that has the molar ratio of hydrogen to nitrogen of less than 3.0 and to reject nitrogen from the first portion of the reformer effluent and to produce a hydrogen product gas and a fuel gas containing the nitrogen; and a synthesis loop that is configured to receive an ammonia synthesis make-up gas that is a mixture of at least the hydrogen product gas and a second portion of the feed gas.

10. The plant of claim 9 wherein the primary reformer is configured to receive natural gas as a feed.

11. The plant of claim 10 further comprising a methanator upstream of the pressure swing absorption unit.

12. The plant of claim 10 further comprising an acid gas removal unit upstream of the pressure swing absorption unit.

13. The plant of claim 10 wherein the synthesis loop is configured to produce a purge gas, and wherein the primary reformer is configured to combust at least one of the purge gas and the fuel gas.

14. The plant of claim 9 wherein the ammonia synthesis make-up gas has a molar ratio of hydrogen to nitrogen of about 3:1.

15. The plant of claim 9 wherein the pressure swing absorption unit is configured such that at least a portion of nitrogen, argon, and methane contained in the feed gas is removed from the feed gas via the fuel gas.

16. The plant of claim 9 wherein the pressure swing absorption unit is configured to functionally cooperate with a plant configuration as an upgrade that increases an ammonia production of the plant configuration in an amount of between about 0.1% to 25%.

* * * * *